Aug. 7, 1951  C. F. KETTERING  2,563,341
HUMIDITY CONTROL
Filed Nov. 30, 1949

Inventor
Charles F. Kettering
By
Willits, Helmig & Baillio
Attorneys

Patented Aug. 7, 1951

2,563,341

UNITED STATES PATENT OFFICE 2,563,341

HUMIDITY CONTROL

Charles F. Kettering, Detroit, Mich., assignor to General Motors Corporation, Detroit, Mich., a corporation of Delaware Application November 30, 1949, Serial No. 130,301

3 Claims. (Cl. 200—52)

My invention relates to a control means which is responsive to humidity changes and which is used to control apparatus for maintaining the moisture content of air at a given predetermined amount within a prescribed enclosure.

It is an object of my invention to provide a new and novel hygrostat to maintain constant a desired humidity.

It is a further object of my invention to provide a simple and rugged humidity sensitive control device.

With these and other objects in view which will become apparent as the specification proceeds, my invention will be best understood by reference to the following specification and claims and the illustrations in the accompanying drawings, in which:

Figure 1:
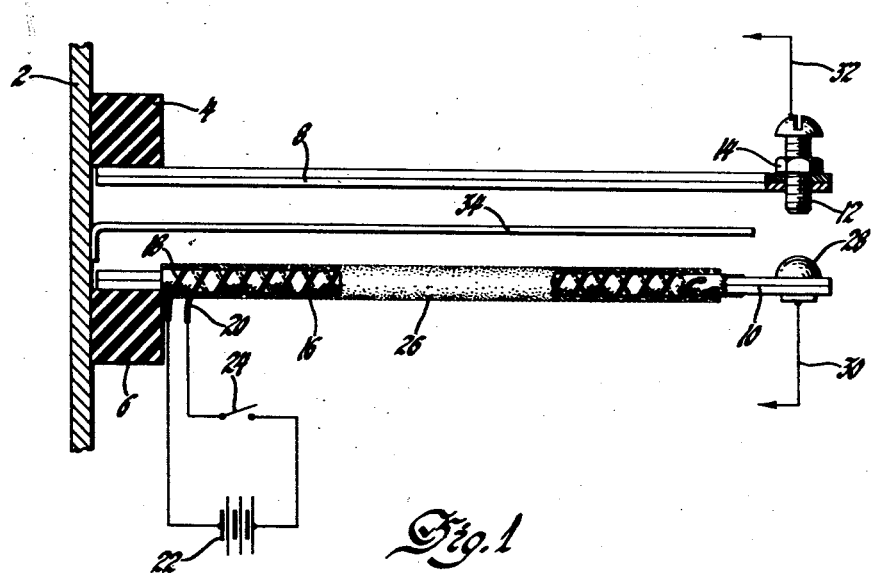
Figure 1 is a side elevation partly in section of a hygrostat embodying my invention.
Figure 2:
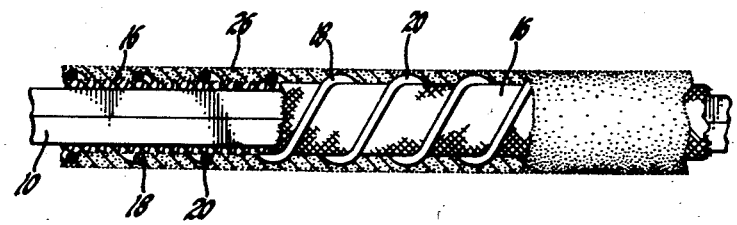
Figure 2 is an enlarged side view partly in section of the hygroscopic element of my invention.

Referring now more particularly to the drawings, there is shown therein a base 2 to which are rigidly secured by any suitable means a pair of spaced upstanding supports 4 and 6 of insulating material. In like manner there are fixedly secured at one end to each of the supports, bi-metal bars 8 and 10 respectively. These bi-metal members extend from their end supports in parallel spaced relation and are so mounted that they will deflect in the same direction upon a change in temperature. Bi-metal strip 8 is provided at the outer end with an adjustable contact 12 which may be locked in adjusted position by a lock nut 14. Bi-metallic thermostatic bar 10, on the other hand, has wound around the major portion of its length a layer of electrical insulating material such as woven glass fabric 16. Over the glass fabric there are wound in spaced parallel relation a pair of wires 18 and 20 of alternate polarity, so that the voltage applied to the wires exists between them throughout their length and the length of the wrapping. The outer ends of the wires remain unconnected.

Wire 18 is connected to one terminal of a source of power which is diagrammatically shown as a battery 22, but which may be a generator or any other source for providing a voltage on said wires. Wire 20 is connected through switch 24 to the other battery terminal. The assembly of glass fabric and pair of wires is then coated with a layer of hygroscopic substance 26 which may be a salt substance; for example, lithium chloride. To the outer exposed end of the bar 10 there is secured an electrical contact 28.

Control lines 30 and 32 are connected to contact 28 and adjustable contact 12 respectively and extend to apparatus (not shown) to be controlled by the hygrostat. A thermal shield 34 secured to the base between the two supports 4 and 6 extends between the two bi-metal thermostatic bars and acts to prevent heat flow therebetween to keep heat generated by the wire coil on bi-metal strip 10 from reaching bi-metal strip 8.

Since the two bi-metal strips are mounted in spaced relation on the same base and tend to move in the same direction upon a change in temperature, the device will be self-correcting for changes in ambient temperature as they will both move equal distances upon any ambient temperature change and the distance between the contacts 12 and 28 will remain unchanged unless there is a humidity change.

In the normal operation of the device the hygroscopic substance or salt with which the lower bi-metal strip is covered will tend to absorb moisture from the surrounding atmosphere. The pair of wires 18 and 20 which are wound on the glass fabric in parallel spaced relation throughout their length are connected to a suitable source of power by the closure of switch 24. Under dry conditions there will be no flow of current from wire 18 to wire 20 and, therefore, no flow through the coil formed by these two wires and no heat generated. However, assuming the presence of some moisture in the surrounding air, the substance 26 will tend to absorb some of this moisture and to become damp. The substance 26 in its dampened condition will, therefore, act as a conductor between the wires 18 and 20 and some current will flow. This flow of current will cause a heating effect and this heating will tend to dry out the hygroscopic substance.

The more moisture there is in the air, of course, the more will be absorbed by the hygroscopic substance and the higher the flow of current, and thus in turn the greater heat effect. This combined absorption and heating will, of course, balance at some point where the amount of moisture absorbed by the hygroscopic substance will exactly equal the drying effect of the heating coil, and the system will stabilize with a given amount of heat being applied. This heat will, of course, since the coil is wound around the bi-metal strip, affect the bi-metal strip and cause it to assume a given deflected position, dependent upon the heat applied, which is in turn dependent upon the moisture, and since the lower bi-metal strip is thermally insulated from the upper, will move toward the same. At some predetermined and set position in the contacts, contact 28 will engage contact 12 upon the humidity in the surrounding enclosure reaching a predetermined point and this closure will control humidifying equipment to maintain the humidity at said desired proportion. It will be evident from the above discussion that the hygrostat of the present invention is a simple and rugged foolproof instrument which will operate over a long period with no attention.

I claim:

1. In a hygrostat, a base, a pair of bi-metal thermostatic elements secured in insulated spaced relation to said base, contact members carried on the outer ends of the bi-metal elements, heating means mounted on one of said bi-metal elements and a coating of hygroscopic substance covering the heating means and determining the proportional heating so that relative humidity changes in the surrounding atmosphere will cause different degrees of heating and relative motion between the contacts carried by the strips.

2. In a hygrostat, a base, a pair of bi-metal thermostatic elements secured in insulated spaced relation to said base, contact members carried on the outer ends of the bi-metal elements, thermal shielding means mounted between the bi-metal elements, heating means mounted on one of the bi-metal elements, a hygroscopic coating mounted over the heating means and controlling the proportional heating effect thereof so that heat proportional to the humidity content of the surrounding atmosphere will be applied to one of the thermostatic elements but such heat will not reach the other thermostatic element which is affected only by ambient temperature and changes in humidity will cause relative movement between the contacts.

3. In a hygrostat, a base, a pair of spaced thermostatic elements insulatedly secured to said base, circuit controlling contact means carried at the free end of each of the thermostatic elements, a thermal shield mounted on the base and extending between the thermostatic elements to prevent local heating of one element from reaching the other, a layer of insulating material wound on the major portion of one of the thermostatic elements, a pair of parallel wires wound helically over the insulating material and a coating of hygroscopic substance over the assembly of the wires and insulating means so that the flow of current through the wires to cause a heating effect when power is supplied thereto is controlled by the moisture in the hygroscopic coating which local heating is prevented from reaching the other thermostatic element and relative motion between the two occurs to control exterior apparatus.

CHARLES F. KETTERING.

REFERENCES CITED

The following references are of record in the file of this patent:

UNITED STATES PATENTS

| Number | Name | Date |
|---|---|---|
| 1,682,915 | Lawrence | Sept. 4, 1928 |
| 1,694,107 | Starkins | Dec. 4, 1928 |
| 1,783,904 | Carter et al. | Dec. 2, 1930 |